Patented Dec. 6, 1938

2,139,119

UNITED STATES PATENT OFFICE 2,139,119

DIOXAZINE SULPHONIC ACIDS

Heinrich Greune and Ernst Sturm, Frankfort-on-the-Main-Hochst, and Martin Reuter, Frankfort-on-the-Main-Unterliederbach, Germany, assignors to General Aniline Works, Inc., New York, N. Y., a corporation of Delaware No Drawing. Application January 22, 1936, Serial No. 60,346. In Germany February 2, 1935

1 Claim. (Cl. 260—246)

The present invention relates to dyestuff-sulphonic acids and to a process of preparing them.

We have found that valuable dyestuff-sulphonic acids are obtainable by treating a diarylaminobenzoquinone derivative of the following formula

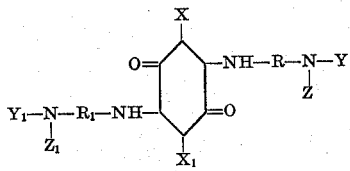

wherein X and $X_1$ represent hydrogen, alkyl, aryl or halogen, R and $R_1$ stand for a sulphonated aromatic radical the two basic nitrogen atoms attached to R or $R_1$ standing in para positions to each other and Y, $Y_1$, Z and $Z_1$ mean hydrogen, alkyl, aralkyl or acyl, with an acid or alkaline condensing agent preferably in the presence of an organic or inorganic oxidizing agent.

By treating with condensing agents of the above kind, ring closure with formation of dioxazine rings occurs; by using sulphuric acid or fuming sulphuric acid as condensing agent, further sulpho radicals may simultaneously enter into the dyestuff molecule.

The 1,4-benzoquinone derivatives, used as parent materials, may be obtained, for instance, by condensation of benzoquinone, toluquinone, tetrachloroquinone, 2,6-dichloroquinone, tetrabromoquinone with the corresponding aminosulphonic acids, for instance, 1,4-phenylenediamine-2,6-disulphonic acid or 1-acetylamino-4-aminonaphthalene-6-sulphonic acid or the like.

The dyestuff-sulphonic acids obtainable by treating the said 1,4-benzoquinone derivatives with acid or alkaline condensing agents, preferably in the presence of an organic or inorganic oxidizing agent, dye vegetable, animal and viscose artificial fibers as well as mixed fabrics fast tints of various shades and represent a valuable enrichment of this class of dyestuffs.

The following examples serve to illustrate the invention, but they are not intended to limit it thereto; the parts are by weight:

1. 10 parts of the condensation product from chloranil and 1,4-phenylenediamine-2,6-disulphonic acid of the formula:

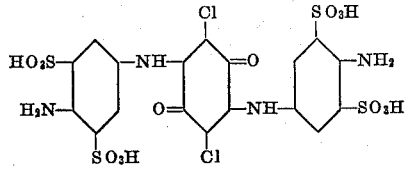

are heated for 10 hours at 90° C. to 95° C. with 100 parts of fuming sulphuric acid of 10 per cent strength. The whole is poured on ice; the sulphonation product which is thus obtained with a good yield dyes cotton vivid reddish blue tints.

2. 20 parts of the 1,4-benzoquinone derivatives used in Example 1 are heated for 2 to 3 hours at 90° C. to 95° C. with 200 parts of fuming sulphuric acid of 15 per cent strength. The whole is poured on ice; the sulphonation product thus obtained with a good yield dyes wool, silk, cotton and viscose artificial silk clear blue tints.

3. 10 parts of the condensation product from chloranil and 1,4-phenylenediamine-2-sulphonic acid of the formula

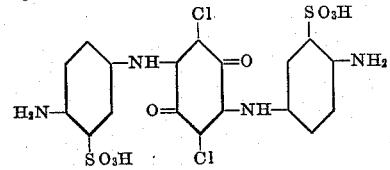

are heated for 3 to 4 hours at 90° C. to 95° C. with 100 parts of fuming sulphuric acid of 10 per cent strength. The whole is poured on ice; the sulphonation product thus obtained with a good yield dyes cotton and viscose artificial silk in a saline solution or a solution rendered alkaline by means of sodium carbonate, blue tints.

4. 10 parts of the condensation product from chloranil and 1-acetylamino-4-aminonaphthalene-6-sulphonic acid are dissolved in 200 parts of concentrated sulphuric acid and the whole is heated at 90° C. to 100° C. for some time, while stirring. The sulphuric acid solution is then poured on ice, the dyestuff which has separated is filtered with suction, washed with a sodium chloride solution until neutral and dried. The dyestuff thus obtained dyes cotton and viscose artificial silk as well as mixed fabrics from a saline solution or a solution rendered alkaline by means of sodium carbonate clear greenish blue tints.

A very similar dyestuff is obtainable by treating with concentrated sulphuric acid or fuming sulphuric acid, as above indicated, the condensation product from chloranil and 1-acetylamino-4-aminonaphthalene-7-sulphonic acid or from chloranil and the mixture of 1-acetylamino-4-aminonaphthalene-6- and 7-sulphonic acid.

5. 50 parts of the condensation product from chloranil and 1-acetylamino-4-aminobenzene-3-sulphonic acid of the formula

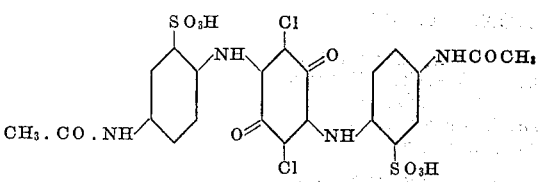

are heated with 1000 parts of fuming sulphuric acid containing 10% of sulphuric anhydride for 7 hours at 90° C. to 95° C. The whole is poured on ice and the sulphonation product is obtained with a good yield. It dyes cotton and viscose artificial silk from a bath rendered alkaline by means of sodium carbonate grey-blue tints.

6. Similar dyestuffs are obtained by using in the foregoing examples instead of chloranil, dichlorobenzoquinone, benzoquinone or toluquinone.

We claim:

The sodium salt of the compound of the formula:

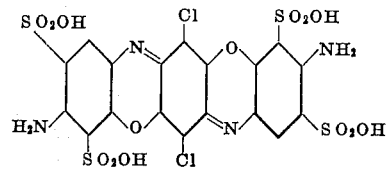

dyeing cotton vivid reddish blue tints.

HEINRICH GREUNE.
ERNST STURM.
MARTIN REUTER.